United States Patent
Takahashi et al.

(10) Patent No.: US 6,846,163 B2
(45) Date of Patent: Jan. 25, 2005

(54) ROTARY FLUID MACHINE HAVING ROTOR SEGMENTS ON THE OUTER PERIPHERY OF A ROTOR CORE

(75) Inventors: Tsutomu Takahashi, Wako (JP); Kensuke Honma, Wako (JP); Naoki Itoh, Wako (JP); Tsuneo Endoh, Wako (JP)

(73) Assignee: Honda Giken Kogyo Kabushiki Kaisha, Toyko (JP)

( * ) Notice: Subject to any disclaimer, the term of this patent is extended or adjusted under 35 U.S.C. 154(b) by 0 days.

(21) Appl. No.: 10/363,649
(22) PCT Filed: Sep. 4, 2001
(86) PCT No.: PCT/JP01/07652
§ 371 (c)(1),
(2), (4) Date: Sep. 24, 2003
(87) PCT Pub. No.: WO02/20986
PCT Pub. Date: Mar. 14, 2002

(65) Prior Publication Data
US 2004/0050246 A1 Mar. 18, 2004

(30) Foreign Application Priority Data
Sep. 4, 2000 (JP) ........................................ 2000-271511

(51) Int. Cl.⁷ ........................... F04B 23/10; F01B 13/06; F01B 21/04; F01C 21/08
(52) U.S. Cl. ........................... 417/204; 60/716; 91/491; 92/72; 418/259
(58) Field of Search ................................ 417/204–206, 417/199.1; 418/259; 60/716; 91/491; 92/72

(56) References Cited
U.S. PATENT DOCUMENTS
2,612,110 A * 9/1952 Delegard .................... 417/204
3,585,904 A    6/1971  White ......................... 91/498

FOREIGN PATENT DOCUMENTS

| DE | 239833 | * 10/1986 | ............... 418/259 |
| FR | 629.501 | * 7/1927 | ............... 418/259 |
| FR | 1.127.161 | * 8/1956 | ............... 417/204 |
| JP | 59-41602 A | 3/1984 | |
| JP | 60-206990 A | 10/1985 | |
| JP | 62-101087 U | 6/1987 | |

* cited by examiner

Primary Examiner—John J. Vrablik
(74) Attorney, Agent, or Firm—Birch, Stewart, Kolasch & Birch, LLP

(57) ABSTRACT

In a rotary fluid machine including pistons (37) reciprocally received in cylinders (33) provided in a rotor (27), and vanes (44) fitted in vane grooves provided in the rotor (27) for reciprocal movement, the rotor (27) includes a rotor core (31) which is supported on a rotary shaft (21) and in which the cylinders (33) are accommodated, and twelve rotor segments (32) separated in a circumferential direction and fixed to surround an outer peripheral surface of the rotor core (31); and each of the vane grooves (43) is defined between the adjacent rotor segments (32). Thus, the dimensional accuracy of the vane grooves (43) can be enhanced without need for a special accurate working or processing. In addition, the transmission of heat from the rotor core (31) of a relatively high temperature to the rotor segments (32) of a relatively low temperature can be blocked, whereby the dissipation of the heat to the outside of the rotor (27) can be suppressed, leading to an enhancement in heat efficiency, and moreover, the thermal deformation of various portions of the rotor (27) can be moderated.

12 Claims, 12 Drawing Sheets

US 6,846,163 B2

ROTARY FLUID MACHINE HAVING ROTOR SEGMENTS ON THE OUTER PERIPHERY OF A ROTOR CORE

This application is the national phase under 35 U.S.C. §371 of PCT International Application No. PCT/JP01/07652 which has an International filing date of Sep. 4, 2001, which designated the United States of America.

FIELD OF THE INVENTION

The present invention relates to a rotary fluid machine capable of being used as an expander or a compressor.

BACKGROUND ART

A double multi-vane type rotary fluid machine system is described in Japanese Patent Application Laid-open No. 59-41602. In this rotary fluid machine system, a circular vane-supporting ring is disposed between an elliptic outer cam ring and an elliptic inner cam ring, and outer and inner ends of a plurality of vanes radially slidably supported on the vane-supporting ring are in abutment against an inner peripheral surface of the outer cam ring and an outer peripheral surface of the inner cam ring, respectively. Therefore, when the vane-supporting ring is rotated relative to the outer cam ring and the inner cam ring, the volumes of a plurality of vane chambers partitioned by the vanes between the outer cam ring and the vane-supporting ring are increased or decreased and in this manner, the rotary fluid machine system functions as an expander or compressor. In addition, the volumes of a plurality of vane chambers partitioned by the vanes between the inner cam ring and the vane-supporting ring are increased or decreased and in this manner, the rotary fluid machine system functions as an expander or compressor.

In this double multi-vane type rotary fluid machine system, the outer and inner rotary fluid machines can be used as independent expanders, respectively; the outer and inner rotary fluid machines can be used as independent compressors, respectively; and one and the other of the outer and inner rotary fluid machines can be used as an expander and a compressor, respectively.

A vane-type rotary fluid machine system capable of being used as an expander or a compressor is described in Japanese Patent Application Laid-open No. 60-206990. In this rotary fluid machine system, a circular intermediate cylinder is disposed eccentrically between a circular outer cam ring and a circular inner cam ring disposed concentrically with each other, and outer and inner ends of a plurality of vanes radially slidably supported in the intermediate cylinder are in abutment against an inner peripheral surface of the outer cam ring and an outer peripheral surface of the inner cam ring, respectively. Therefore, when the intermediate cylinder is rotated relative to the outer cam ring and the inner cam ring, the volumes of a plurality of vane chambers partitioned by the vanes between the outer cam ring and the intermediate cylinder are increased or decreased and in this manner, the rotary fluid machine system functions as an expander or a compressor. In addition, the volumes of a plurality of vane chambers partitioned by the vanes between the inner cam ring and the intermediate cylinder are increased or decreased and in this manner, the rotary fluid machine system functions as an expander or a compressor.

In this vane-type rotary fluid machine system, the outer and inner rotary fluid machines can be used as independent expanders, respectively; the outer and inner rotary fluid machines can be used as independent compressors, respectively; and in addition, the outer and inner rotary fluid machines can be connected in line to each other and operated as a two-stage expander or a two-stage compressor by allowing a working fluid passed through one of the outer and inner rotary fluid machines to be passed through the other rotary fluid machine.

It should be noted here that in the conventional vane-type rotary fluid machine system, a rotor supporting cylinders and the vanes is formed by a single member and hence, it is difficult to enhance the working accuracy for vane grooves, and there is a possibility that clearances between the vane grooves and the vanes may be uneven, resulting in a reduction in wear resistance and a reduction in sealability. The conventional vane-type rotary fluid machine system also suffers from a problem that a central portion of the rotor accommodating the cylinders therein is heated to a high temperature, but since the rotor is formed by a single member, it is easy for a heat of the central portion to be transmitted to an outer peripheral portion having the vanes accommodated therein, and the above-described disadvantage is further increased due to the thermal deformation, and moreover, the heat of the central portion of the rotor is easy to escape to the outside, resulting in a reduction in heat efficiency. In addition, since the rotor is formed by the single member, even when there is a disadvantage in a portion of the rotor, the entire rotor is required to be replaced by a new rotor, which is inconvenient for the cost.

DISCLOSURE OF THE INVENTION

The present invention has been accomplished with the above-described circumstances in view, and it is an object of the present invention to provide enhancements in accuracy and durability of a rotor, an enhancement in heat efficiency and a reduction in cost in a rotary fluid machine including a rotor which supports cylinders and vanes.

To achieve the above object, according to an aspect and feature of the present invention, there is proposed a rotary fluid machine which includes at least a first energy-converting means and a second energy-converting means, and is capable of functioning as an expander for unifying and outputting mechanical energies generated respectively by the first and second energy-converting means by inputting a working fluid having a pressure energy into the first and second energy-converting means to convert the pressure energy into a mechanical energy, the rotary fluid machine being capable of functioning as a compressor for unifying and outputting pressure energies of the working fluid generated respectively by the first and second energy-converting means by inputting the mechanical energy into the first and second energy-converting means to convert the mechanical energy into the pressure energy, the first energy-converting means including cylinders supported radially in a rotor rotatably accommodated in a rotor chamber, and pistons slidably supported in the cylinders, and the second energy-converting means including vane grooves defined radially in the rotor, and vanes slidably supported in the vane groove with their outer peripheral surfaces being in sliding contact with an inner peripheral surface of the rotor chamber, characterized in that the rotor includes a rotor core which is supported on a rotary shaft and in which the cylinders are accommodated, and rotor segments separated in a circumferential direction and fixed to surround an outer periphery of the rotor core, each of the vane grooves for slidably supporting the vanes therein being defined between the adjacent rotor segments.

With the above arrangement, the rotor of the rotary fluid machine includes the rotor core which is supported on the rotary shaft and in which the cylinders are accommodated, and the rotor segments separated in the circumferential direction and fixed so as to surround the outer periphery of the rotor core. Therefore, the regulation of the size of rotor segment to be assembled finally can compensate for an error accumulated due to the assembling of all the other rotor segments, and the dimensional accuracy of the vane grooves defined between the adjacent rotor segments can be enhanced without need for a special accurate working or processing.

Since the rotor core positioned at the radially inner location and the rotor segments positioned at the radially outer locations are formed by the different members, the transmission of heat from the rotor core of a relatively high temperature to the rotor segments of a relatively low temperature is blocked, whereby the dissipation of the heat to the outside of the rotor can be suppressed to enhance the heat efficiency, and moreover, the thermal deformation of various portions of the rotor can be moderated.

In addition, a material and a processing method suitable for each of the functions of the rotor core and the rotor segments can be selected and hence, the degree of freedom of the design and the degree of freedom of the processing method are increased, and the alleviation of the wearing of the sliding surfaces, an enhancement in durability and an enhancement in sealability can be achieved.

Further, even when a disadvantage occurs in a portion of the rotor, the rotor can be repaired only by replacing such portion by a new portion without replacement and discarding of the entire rotor. This can contribute to a reduction in cost.

BRIEF DESCRIPTION OF THE DRAWINGS

FIG. 1 is a diagrammatic illustration of a waste heat recovery system for an internal combustion engine;

FIG. 2 is a vertical sectional view of an expander, corresponding to a sectional view taken along a line 2—2 in FIG. 4;

FIG. 3 is enlarged sectional view of an area around an axis of a rotary shaft in FIG. 2;

FIG. 4 is a sectional view taken along a line 4—4 in FIG. 2;

FIG. 5 is a sectional view taken along a line 5—5 in FIG. 2;

FIG. 6 is an enlarged view of a portion of FIG. 4;

FIG. 7 is an enlarged sectional view taken along a line 7—7 in FIG. 3;

FIG. 8 is a diagram showing sectional shapes of a rotor chamber and a rotor;

FIG. 9 is an exploded perspective view of the rotor;

FIG. 10 is an exploded perspective view of the rotor segment;

FIG. 11 is an exploded perspective view of a vane; and

FIG. 12 is an exploded perspective view of a rotary valve.

BEST MODE FOR CARRYING OUT THE INVENTION

Figure 1:
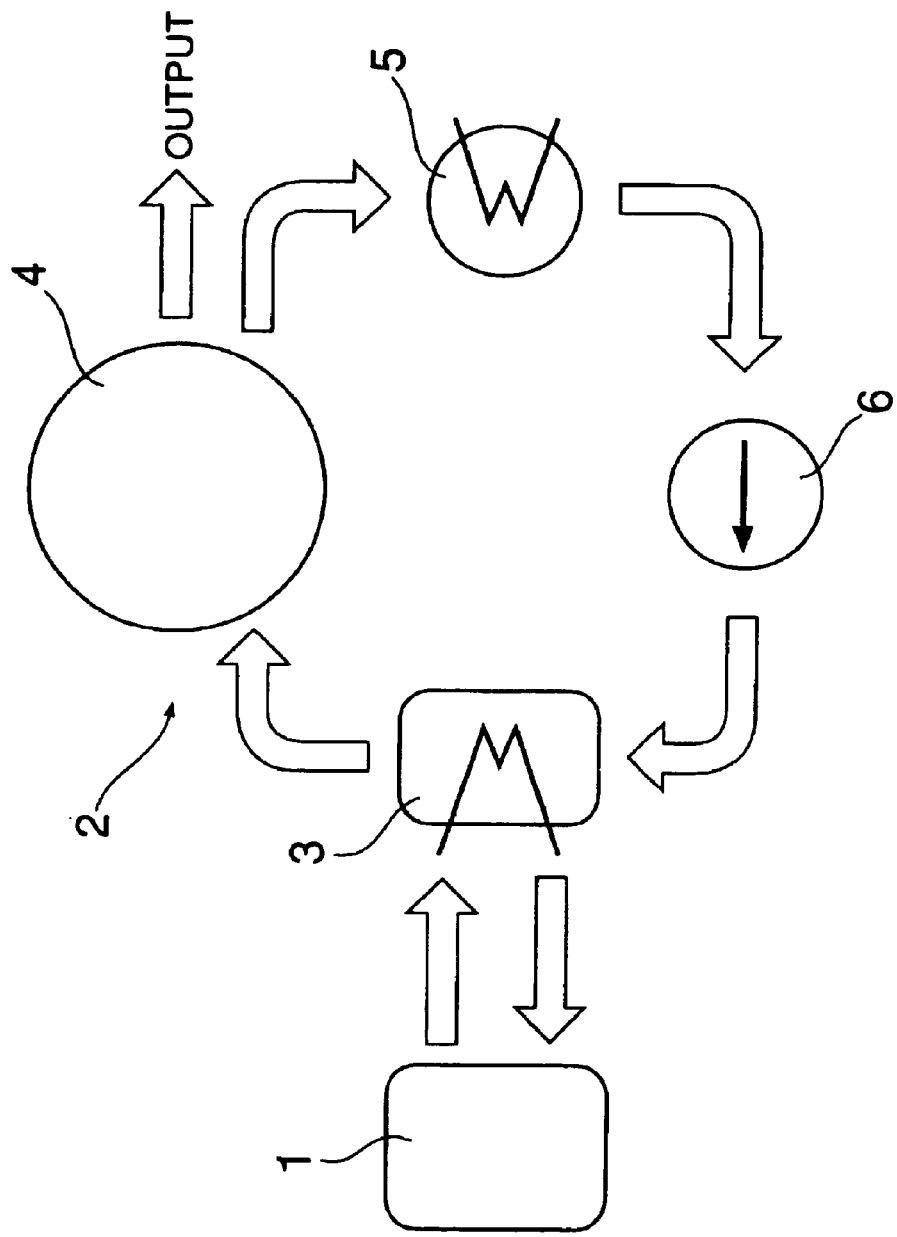
FIGS. 1 to 12 show an embodiment of the present invention.

Referring to FIG. 1, a waste heat recovery system 2 for an internal combustion engine 1 includes an evaporator 3 for generating a vapor in a high-temperature and high-pressure state resulting from the gasification of a liquid (e.g., water) in a high-pressure state, using a waste heat (e.g., an exhaust gas) from the internal combustion engine 1 as a heat source, an expander 4 for generating an output by the expansion of the vapor, a condenser 5 for liquefying the vapor dropped in temperature and pressure by converting a pressure energy into a mechanical energy in the expander 4, and a supply pump 6 for supplying the liquid (e.g., water) from the condenser 5 under a pressure again to the evaporator 3.

The entire structure of the expander 4 will be first described with reference to FIGS. 2 to 6.

The expander 4 has a casing 11 which includes first and second casing halves 12 and 13 made of metal. The first and second casing halves 12 and 13 include main bodies 12a and 13a which constitute a rotor chamber 14 by cooperation with each other, and circular flanges 12b and 13b integrally connected to outer peripheries of the main bodies 12a and 13a, respectively. The circular flanges 12b and 13b are coupled to each other through a metal gasket 15. An outer surface of the first casing half 12 is covered with a deep bowl-shaped relay chamber outer-wall 16, and a circular flange 16a integrally connected to an outer periphery of the outer wall 16 is superposed on a left side of the circular flange 12b of the first casing half 12. An outer surface of the second casing half 13 is covered with an exhaust chamber outer-wall 17 in which a magnet coupling (not shown) for transmitting the output from the expander 4 to the outside is accommodated, and a circular flange 17a integrally connected to an outer periphery of the outer wall 17 is superposed on a right side of the circular flange 13b of the second casing half 13. The four circular flanges 12a, 13a, 16a and 17a are fastened commonly by a plurality of bolts 18 disposed circumferentially. A relay chamber 19 is defined between the relay chamber outer-wall 16 and the first casing half 12, and an exhaust chamber 20 is defined between the exhaust chamber-outer wall 17 and the second casing half 13. A discharge port 17b for guiding the dropped-temperature and dropped-pressure vapor finishing its work in the expander 4 to the condenser 5 is provided in the exhaust chamber-outer wall 17.

The main bodies 12a and 13a of the casing halves 12 and 13 have hollow bearing tubes 12c and 13c protruding outwards, respectively, and a rotary shaft 21 having a hollow 21a is rotatably supported in the hollow bearing tubes 12c and 13c through a pair of bearing members 22 and 23. Thus, an axis L of the rotary shaft 21 passes through an intersection between a longer diameter and a shorter diameter in a rotor chamber 14 having a substantially elliptic shape. A smaller-diameter portion 21b at a right end of the rotary shaft 21 extends through the hollow bearing tube 13c of the second casing half 13 into the exhaust chamber 20, and a rotor boss 24 of the magnet coupling is spline-coupled to the smaller-diameter portion 21b. An outer periphery of the smaller-diameter portion 21b at the right end of the rotary shaft 21 and an inner periphery of the hollow bearing tube 13c of the second casing half 13 are sealed from each other by a seal member 25, which is fixed by a nut 26 which is threaded fitted to the inner periphery of the hollow bearing tube 13c.

Figure 4:
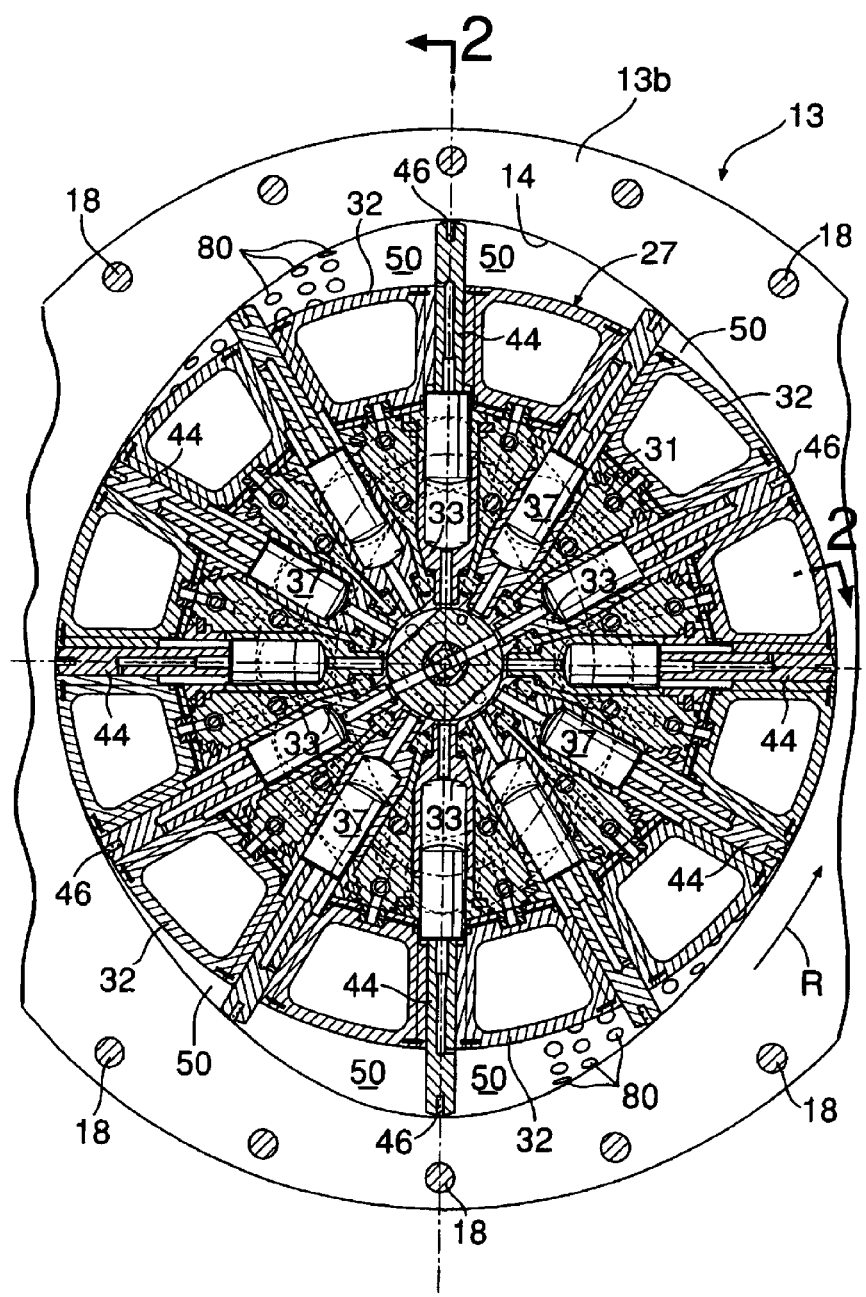
Figure 8:
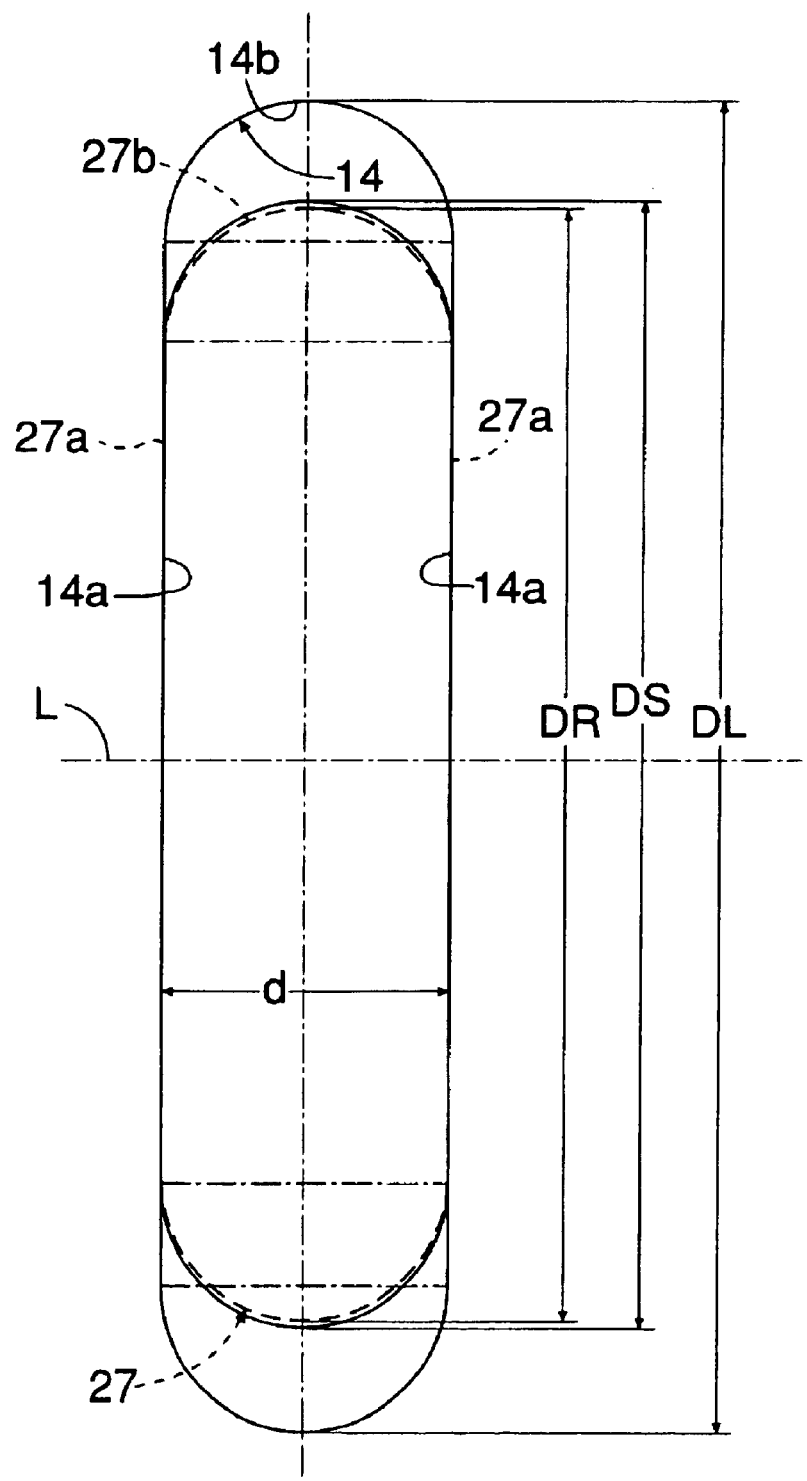

As can be seen from FIGS. 4 and 8, a circular rotor 27 is rotatably accommodated in the rotor chamber 14 having a pseudo elliptic shape. The rotor 27 is fitted over and integrally coupled to an outer periphery of the rotary shaft 21 by a pin 28, and an axis of the rotor 27 and an axis of the rotor chamber 14 are in line with the axis L of the rotary shaft 21. The shape of the rotor chamber 14 as viewed in the direction of the axis L is a pseudo elliptic shape similar to a rhombic shape with four apexes rounded, and the rotor chamber 14 has a longer diameter DL and a shorter diameter DS. The shape of the rotor 27 as viewed in the direction of the axis L is a perfect circle and has a diameter DR slightly smaller than the shorter diameter DS of the rotor chamber 14.

Both of the sectional shapes of the rotor chamber 14 and the rotor 27 as viewed in the direction perpendicular to the axis L are in the form of an athletic track. More specifically, the sectional shape of the rotor chamber 14 is formed from a pair of flat faces 14a, 14a extending in parallel to each other at a distanced left therebetween, and an arcuate face 14b having a center angle of 180° and smoothly connecting outer peripheries of the flat faces 14a, 14a to each other, and the sectional shape of the rotor 27 is formed from a pair of flat faces 27a, 27a extending in parallel to each other at a distance d left therebetween, and an arcuate face 27b having a center angle of 180° and smoothly connecting outer peripheries of the flat faces 27a, 27a to each other. Therefore, the flat faces 14a, 14a of the rotor chamber 14 and the flat faces 27a, 27a of the rotor 27 are in contact with each other, and a pair of spaces (see FIG. 4) forming a crescent shape are defined between the inner peripheral surface of the rotor chamber 14 and the outer peripheral surface of the rotor 27.

The structure of the rotor 27 will be described below in detail with reference to FIGS. 3, 6, 9 and 10.

The rotor 27 includes a rotor core 31 fixed to the outer periphery of the rotary shaft 21, and twelve rotor segments 32 fixed to cover the periphery of the rotor core 31 and forming an outer profile of the rotor 27. The rotor core 31 includes a disk-shaped main body 31a, and a gear-shaped boss portions 31b, 31b protruding in axially opposite directions from a central portion of the main body 31a. Twelve cylinders 33 made of a ceramic (or carbon) are mounted radially at distances of 30° to the main body 31a and fixed thereto by caps 34 and keys 35, so that they are prevented from being withdrawn. A smaller-diameter portion 33a is projectingly provided at an inner end of each of the cylinders 33, and a base end of the smaller-diameter portion 33a and the main body 31a of the rotor core 31 are sealed from each other through an O-ring 36. A tip end of the smaller-diameter portion 33a is fitted over the outer peripheral surface of the hollow rotary shaft 21, and cylinder bores 33b communicate with the hollow 21a in the rotary shaft 21 through twelve third vapor passages S3 extending through the smaller-diameter portions 33a and the rotary shaft 21. A piston 37 made of a ceramic is slidably received in each of the cylinders 33. When the piston 37 is moved to a radially innermost location, it is retracted and sunk completely in the cylinder bore 33b, and when the piston 37 is moved to a radially outermost location, about half of the entire length thereof protrudes to the outside of the cylinder bore 33b.

Each of the rotor segments 32 includes five components coupled to one another. The five components are a pair of block members 38, 38 having hollows 38a, 38a, a pair of side plates 39, 39 made of U-shaped plate materials, and a bottom plate 40 made of a rectangular plate material. These components are integrally connected to one another by brazing.

Two recesses 38b and 38c are defined in an outer peripheral surface of each of the block members 38, namely, a surface opposed to the pair of flat faces 14a, 14a of the rotor chamber 14 to extend in an arcuate shape about the axis L, and lubricating water ejection bores 38d, 38e open into central portions of the recesses 38b and 38c, respectively. A twentieth water passage W20 and a twenty-first water passage W21 are provided in a recessed manner in a face of the block member 38, which is coupled to the side plate 39.

An orifice-defined member 41 having twelve orifices is fitted into a central portion of the bottom plate 40, and an O-ring 42 mounted to the bottom plate 40 to surround the orifice-defined member 41 seals the orifice-defined member 41 and the outer peripheral surface of the main body 31a of the rotor core 31 from each other. Fourteenth to nineteenth water passages W14 to W19 are provided two by two in a recessed manner in a surface of the bottom plate 40 coupled to the block member 38 to extend radially from the orifice-defined member 41. The fourteenth to nineteenth water passages W14 to W19 extend toward the surface coupled to the side plate 39.

Twenty-second to twenty-sixth water passages W22 to W27 are provided in a recessed manner in a surface of each side plate 39 coupled to the block members 38, 38 and the bottom plate 40. The fourteenth water passage W14, the fifteenth water passage W15, the eighteenth water passage W18 and the nineteenth water passage W19 in an outer area of the bottom plate 40 communicate with the twenty-second water passage W22, the twenty-third water passage 23, the twenty-sixth water passage W26 and the twenty-seventh water passage W27 in the side plate 39, and the sixteenth water passage W16 and the seventeenth water passage W27 in an inner area of the bottom plate 40 communicate with the twenty-fourth water passage W24 and the twenty-fifth water passage W25 in the side plate 39 through the twentieth water passage W20 and the twenty-first water passage W21 in the block member 38. Outer ends of the twenty-second water passage W22, the twenty-fifth water passage W25, the twenty-sixth water passage W26 and the twenty-seventh water passage W27 in the side plate 39 open as four lubricating water ejection bores 39a into the outer surface of the side plate 39. Outer ends of the twenty-third water passage W23 and the twenty-fourth water passage W24 in the side plate 39 communicate with the lubricating water ejection bores 38d and 38e in the recesses 38b and 38c through a twenty-eighth water passage W28 and a twenty-ninth water passage W29 defined in each of the block members 38, 38, respectively. A notch 39b having a partially arcuate section is formed in the outer surface of the side plate 39 in order to avoid the interference with the piston 37 moved radially outwards. The reason why the twentieth water passage W20 and the twenty-first water passage W21 are defined in the block member 38 rather than in the side plate 39 is that the side plate 39 has a thickness decreased by provision of the notch 39b, and a thickness enough to define the twentieth water passage W20 and the twenty-first water passage W21 cannot be ensured.

As shown in FIGS. 2, 5, 9 and 11, twelve vane grooves 43 are defined between the adjacent rotor segments 32 of the rotor 27 to extend radially, and plate-shaped vanes 44 are slidably received in the vane grooves 43. Each of the vanes 44 is formed into a substantially U-shape and includes parallel faces 44a, 44a extending along the parallel faces 14a, 14a of the rotor chamber 14, an arcuate face 44b extending along the arcuate face 14b of the rotor chamber 14, and a notch 44c located between the parallel faces 44a, 44a. Rollers 45, 45 having a roller bearing structure are rotatably supported on a pair of support shafts 44d, 44d protruding from the parallel faces 44a, 44a, respectively.

A seal member 46 made of a synthetic resin and formed into a U-shape is retained on the arcuate face 44b of the vane 44, and has a tip end protruding slightly from the arcuate face 44b of the vane 44 to come into sliding contact with the arcuate face 14b of the rotor chamber 14. Sliding members 47, 47 made of a synthetic resin are fixed to the parallel faces 44a, 44a of the vane 44 to come into sliding contact with the parallel faces 14a, 14a of the rotor chamber 14. Sliding members 48, 48 made of synthetic resin are also fixed to opposite sides of the notch 44c of the vane 44 to come into sliding contact with the main body 31a of the rotor core 31. Two recesses 44e, 44e are defined in each of opposite sides of the vane 44 and opposed to radially inner two of the four lubricating water ejection bores 39a opening into the outer surfaces of the side plates 39, 39 of the rotor segment 32. A projection 44f provided at a central portion of the notch 44c of the vane 44 in a protruding manner to face radially inwards abuts against a radially outer end of the piston 37. A water discharge passage 44g is defined in the vane 44 to extend radially, and opens at its radially inner end into a tip end of the projection 44f and at its radially outer end into one of sides of the vane 44. A location at which the water discharge passage 44g opens into the one side of the vane 44 faces a portion of the rotor 27 radially outer than the arcuate face 27b, when the vane 44 is moved to protrude to the radially outermost position.

Annular grooves 49, 49 having a pseudo elliptic shape similar to a rhombic shape with four apexes rounded are provided in a recessed manner in the flat faces 14a, 14a of the rotor chamber 14 defined by the first and second casing halves 12 and 13, and the pair of rollers 45, 45 of each of the vanes 44 are rollably engaged in the annular grooves 49, 49. The distance between each of the annular grooves 49, 49 and the arcuate face 14b of the rotor chamber 14 is constant over the entire periphery. Therefore, when the rotor 27 is rotated, the vane 44 with the rollers 45, 45 guided in the annular grooves 49, 49 is reciprocally moved radially within the vane groove 43 and slid along the arcuate face 14b of the rotor chamber 14 in a state in which the seal member 46 mounted to the arcuate face 44b of the vane 44 has been compressed at a given amount. Thus, it is possible to reliably seal the vane chambers 50 defined between the adjacent vanes 44, while preventing the rotor chamber 14 and the vanes 44 from being brought into direct solid contact with each other to prevent an increase in sliding resistance and the occurrence of the wearing.

A pair of circular seal grooves 51, 51 are defined in the flat faces 14a, 14a of the rotor chamber 14 to surround the outer sides of the annular grooves 49, 49. A pair of ring seals 54 each having two O-rings 52 and 53 are slidably received in the circular seal grooves 51, respectively, and have sealing faces opposed to the recesses 38b and 38c defined in each of the rotor segments 32. The pair of ring seals 54, 54 are prevented from being turned relative to the first and second casing halves 12 and 13 by knock pins 55, 55, respectively.

Figure 9:
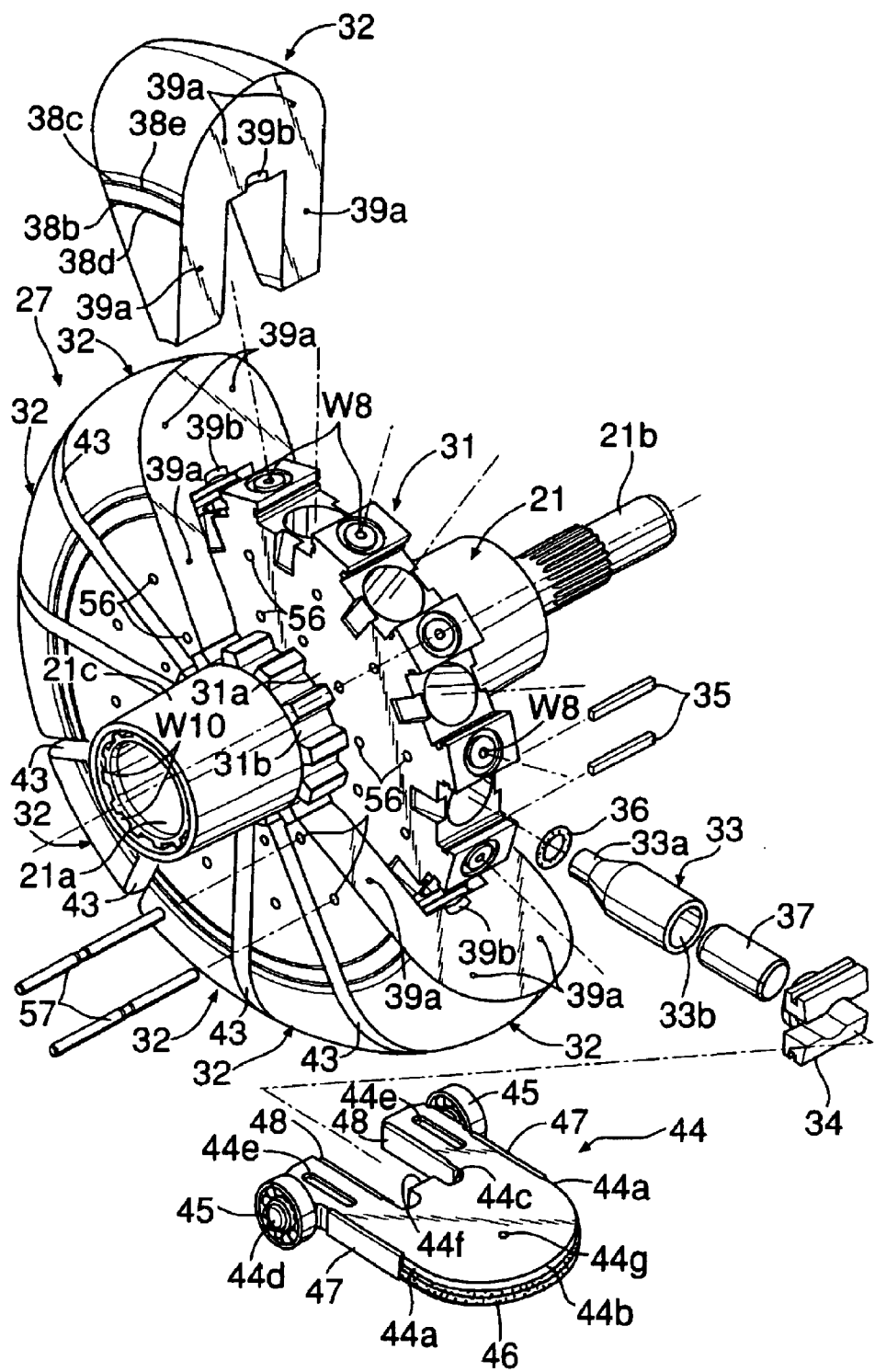
Figure 10:
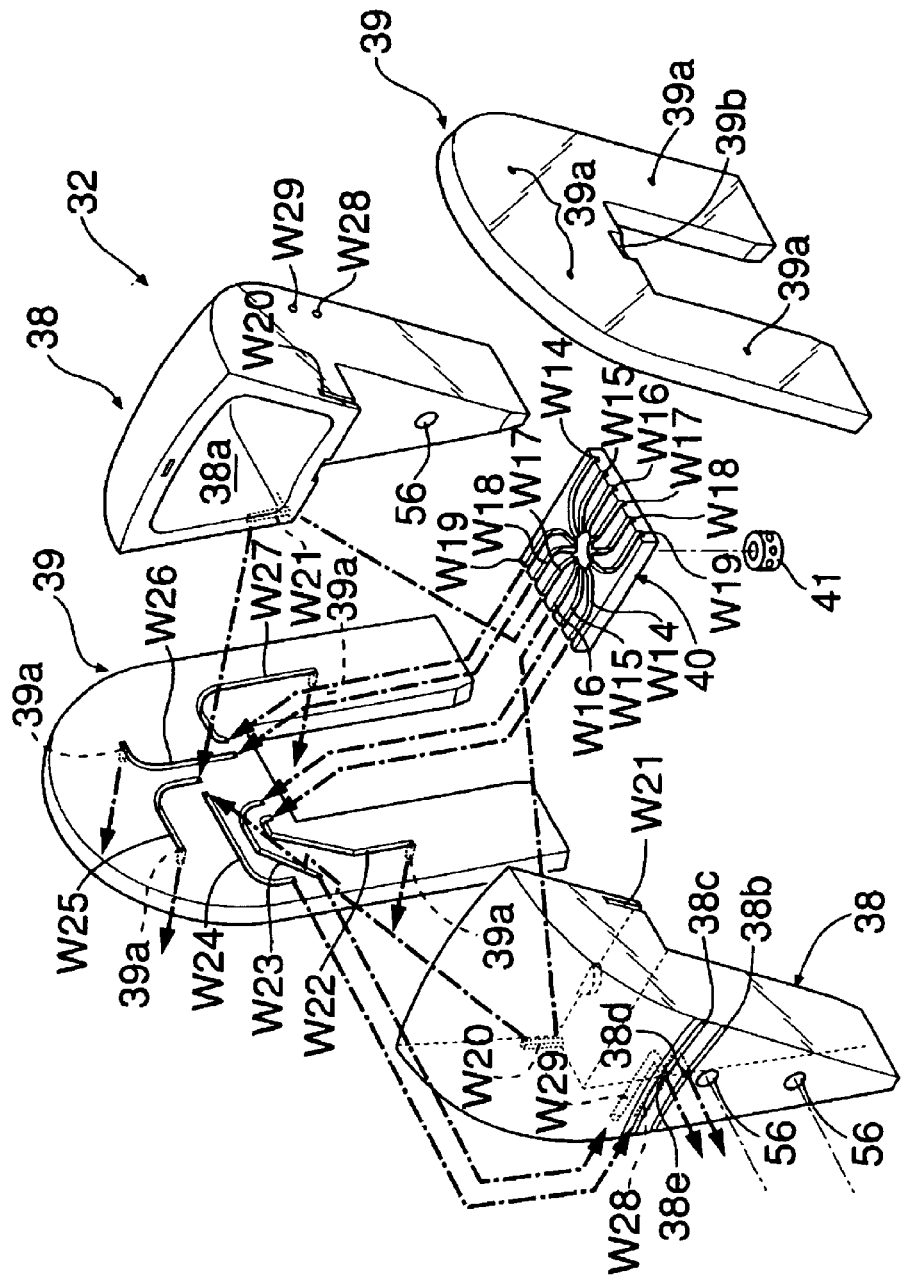
Figure 11:
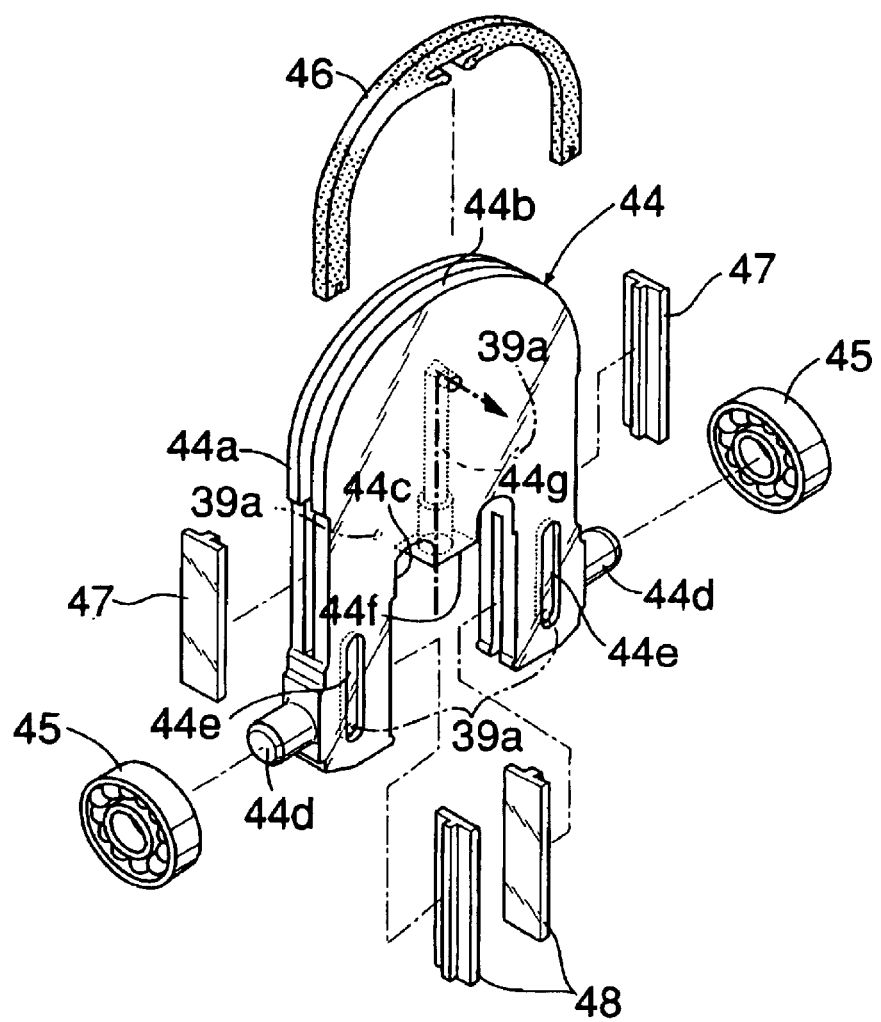

The assembling of the rotor 27 is carried out in the following manner: In FIG. 9, the twelve rotor segments 32 are fitted over the outer periphery of the rotor core 31 having the cylinders 33, the caps 34 and the keys 35 previously assembled thereto, and the vanes 44 are fitted into the twelve vane grooves 43 defined between the adjacent rotor segments 32. At this time, a shim having a predetermined thickness is disposed on each of opposite sides of each vane 44 in order to define a predetermined clearance between each of the vanes 44 and each of the side plates 39 of the rotor segments 32. In this state, the rotor segments 32 and the vanes 44 are tightened radially inwards to the rotor core 31 using a jig, and the rotor segments 32 are positioned accurately relative to the rotor core 31. Thereafter, the rotor segments 32 are temporarily fixed to the rotor core 31 by temporarily fixing bolts 58 (see FIG. 2). Then, the rotor 27 is removed from the jig, and the pinholes 56, 56 are made in each of the rotor segments 32 to extend through the rotor core 31. The knock pins 57, 57 are press-fitted into the pinholes 56, 56, whereby rotor segments 32 are coupled to the rotor core 31.

Figure 3:
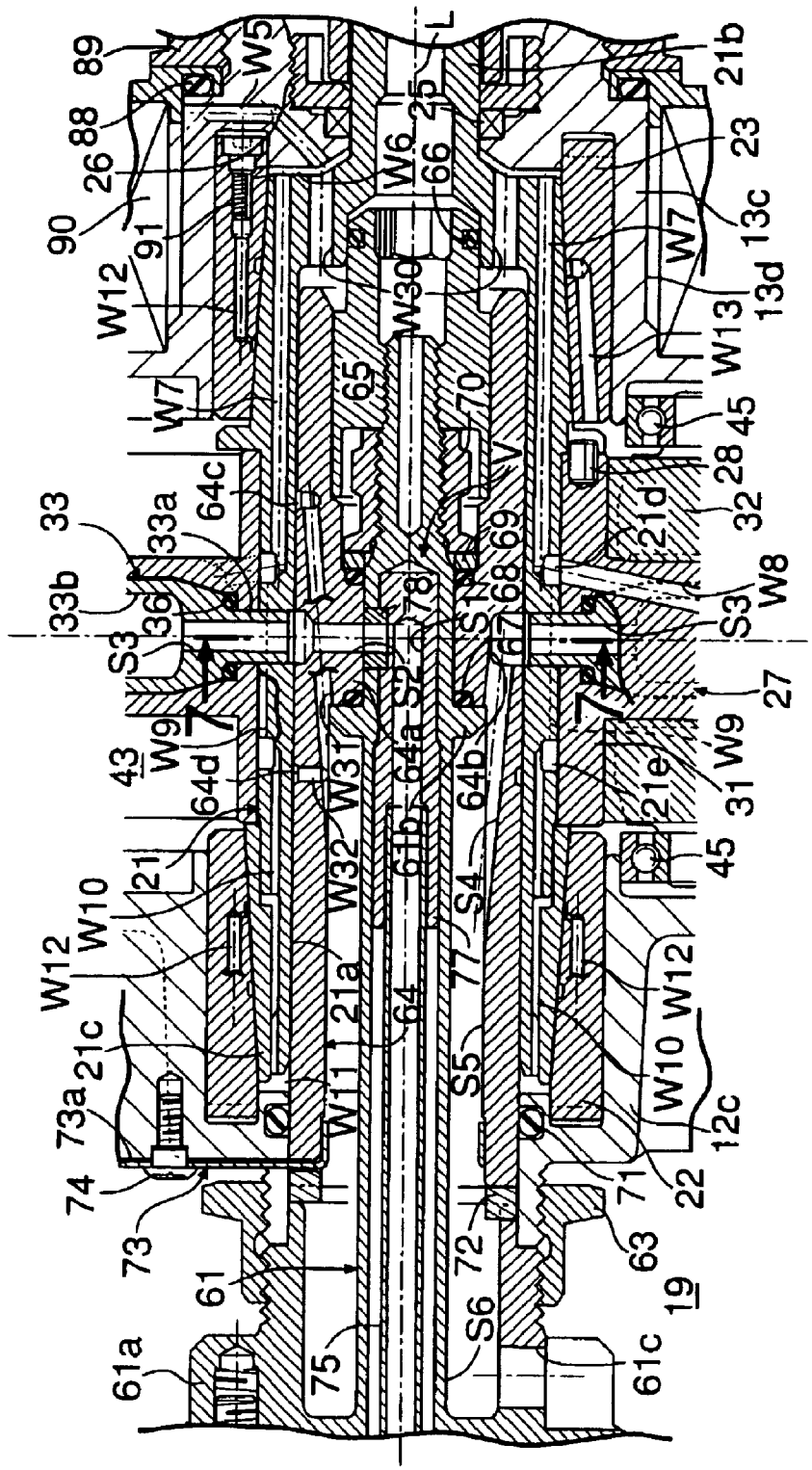
Figure 7:
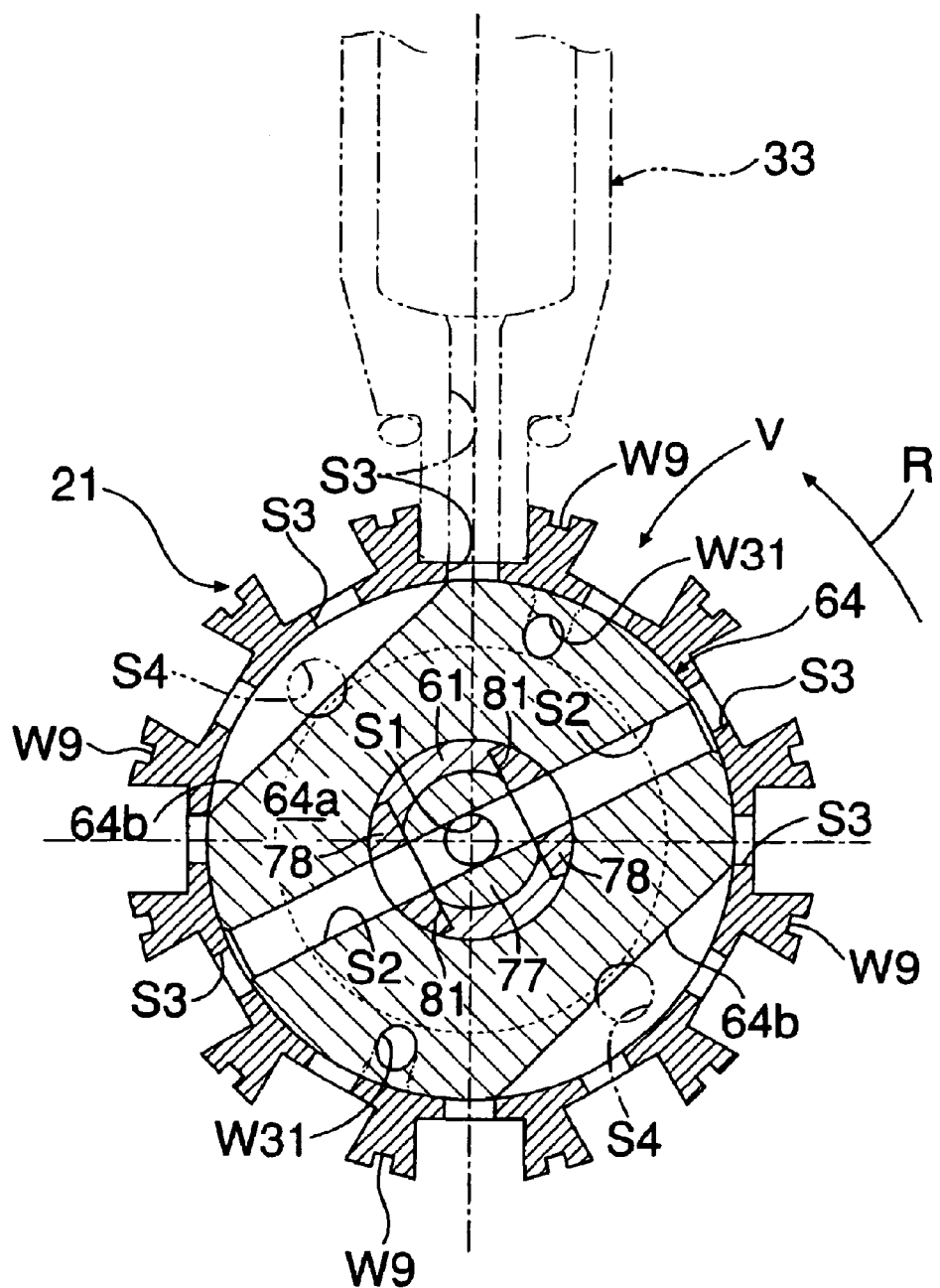
Figure 12:
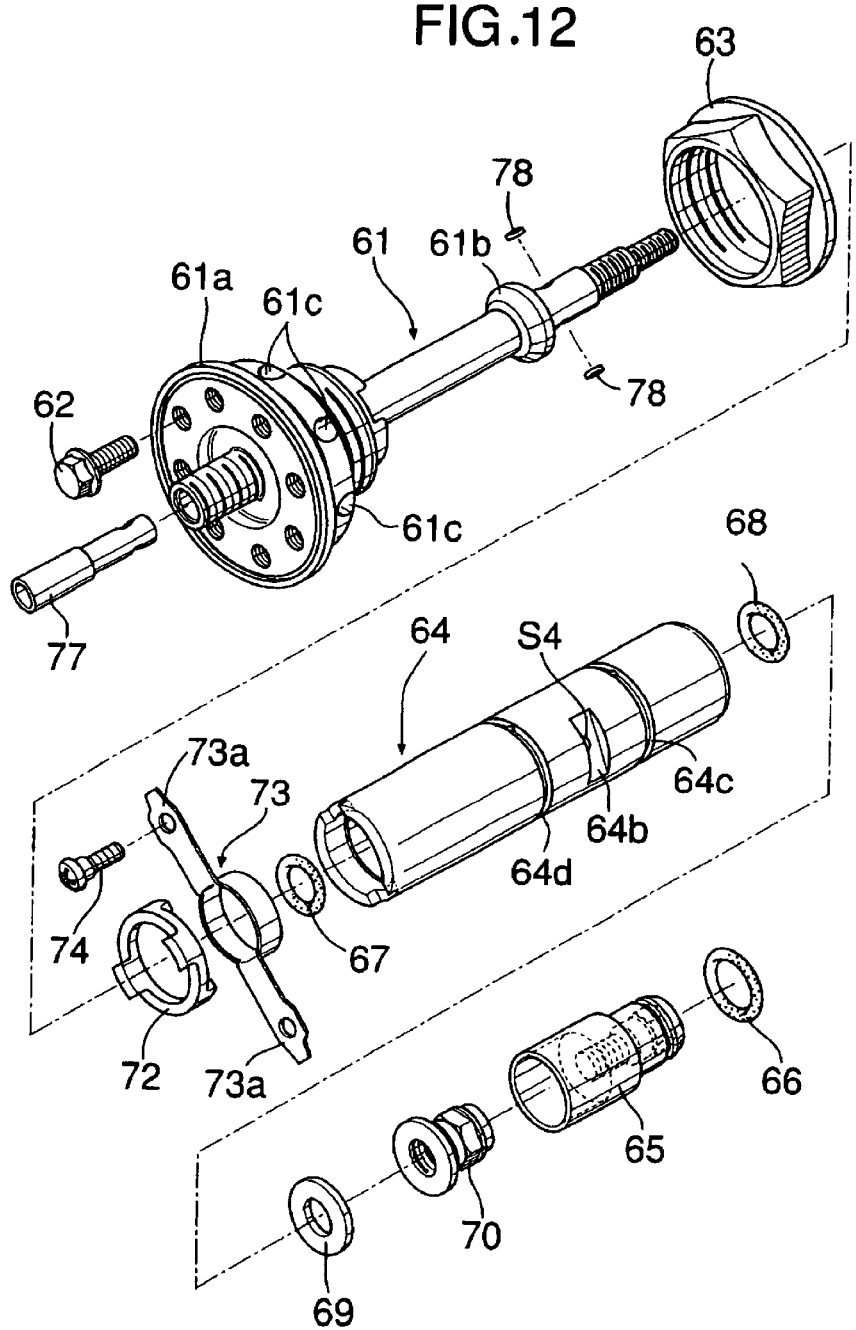

As can be seen from FIGS. 3, 7 and 12, each of the pair of bearing members 22 and 23 supporting the outer peripheral surface of the rotary shaft 21 has an inner peripheral surface which is tapered, so that its diameter is increased toward the rotor 27. The axially outer ends of the bearing members 22 and 23 are engaged in the hollow bearing tubes 12c and 13c of the first and second casing halves 12 and 13, so that they are prevented from being turned. It should be noted that the outer periphery at the left and of the rotary shaft 21 supported in the left hollow bearing tube 12c is formed by a different member 21c in order to enable the assembling of the rotor 27 to the rotary shaft 21.

An opening 16b is defined in the center of the relay chamber outer-wall 16, and a boss portion 61a of a valve housing 61 disposed on the axis L is fixed to the inner surface of the opening 16b by a plurality of bolts 62 and also fixed to the first casing half 12 by a nut 63. A cylindrical first fixing shaft 64 is relatively rotatably fitted in the hollow 21a in the rotary shaft 21, and a second fixing shaft 65 is coaxially fitted to an inner periphery of a right end of the first fixing shaft 64. An outer peripheral portion of a right end of the second fixing shaft 65 protruding from the first fixing shaft 64 and the hollow 21a in the rotary shaft 21 are sealed from each other by an O-ring 66. The valve housing 61 extending within the first fixing shaft 64 includes a flange 61b, and an O-ring 67, a thickened portion 64a of the first fixing shaft 64, an O-ring 68, a washer 69, a nut 70 and the second fixing shaft 65 are fitted sequentially at the right of the flange 61b. The nut 70 and the second fixing shaft 65 are threadedly coupled to the valve housing 61 and hence, the thickened portion 64a of the first fixing shaft 64 is positioned between the flange 61b of the valve housing 61 and the washer 69 with the pair of O-rings 66 and 67 interposed therebetween.

The first fixing shaft 64 supported on the inner periphery of the hollow bearing tube 12c of the first casing half 12 with an O-ring 71 interposed therebetween is connected at its left end to the boss portion 61a of the valve housing 61 by a ring-shaped Oldham coupling 72, and the deflection of the rotor 27 supported on the outer periphery of the first fixing shaft 64 through the rotary shaft 21 can be permitted by permitting the radial deflection of the first fixing shaft 64 by the Oldham coupling 72. In addition, the first fixing shaft 64 is prevented from being turned relative to the casing 11 by fixing arms 73a, 73a of a detent member 73 loosely fitted in the left end of the first fixing shaft 64 to the first casing half 12 by bolts 74, 74.

A vapor supply pipe 75 is fitted within the valve housing 61 disposed on the axis L and is fixed to the valve housing 61 by a nut 76. The vapor supply pipe 75 is connected at its right end to a nozzle member 77 press-fitted into the valve housing 61. A pair of recesses 81, 81 (see FIG. 7) are defined with a phase difference of 180° astride the valve housing 61 and a tip end of the nozzle member 77, and annular joint members 78, 78 are fitted into and retained in the recesses 81, 81. A first vapor passage S1 is defined axially in the center of the nozzle member 77 to lead to the vapor supply pipe 75, and a pair of second vapor passages S2, S2 are provided at a phase difference of 180° to extend radially through the thickened portion 64a of the first fixing shaft 64. A terminal end of the first vapor passage S1 and radially inner ends of the second vapor passages S2, S2 are always in communication with each other through the joint members 78, 78. Twelve third vapor passages S3 are provided to extend through the rotary shaft 21 and the smaller-diameter portions 33*a* of the twelve cylinders 33 retained at the distances of 30° in the rotor 27 fixed to the rotary shaft 21, as described above. Radially inner ends of the third vapor passages S3 are opposed to radially outer ends of the second vapor passage S2, S2 to be able to communicate with them.

A pair of notches 64*b*, 64*b* are defined at a phase difference of 180° in the outer peripheral surface of the thickened portion 64*a* of the first fixing shaft 64 and are capable of communicating with the third vapor passages S3. The notches 64*b*, 64*b* and the relay chamber 19 communicate with each other through a pair of fourth vapor passages S4, S4 defined obliquely in the first fixing shaft 64, a fifth vapor passage S5 defined axially in the first fixing shaft 64, a sixth vapor passage S6 defined in the boss portion 61*a* of the valve housing 61 and through-bores 61*c* opening into the outer periphery of the boss portion 61*a* of the valve housing 61.

Figure 5:
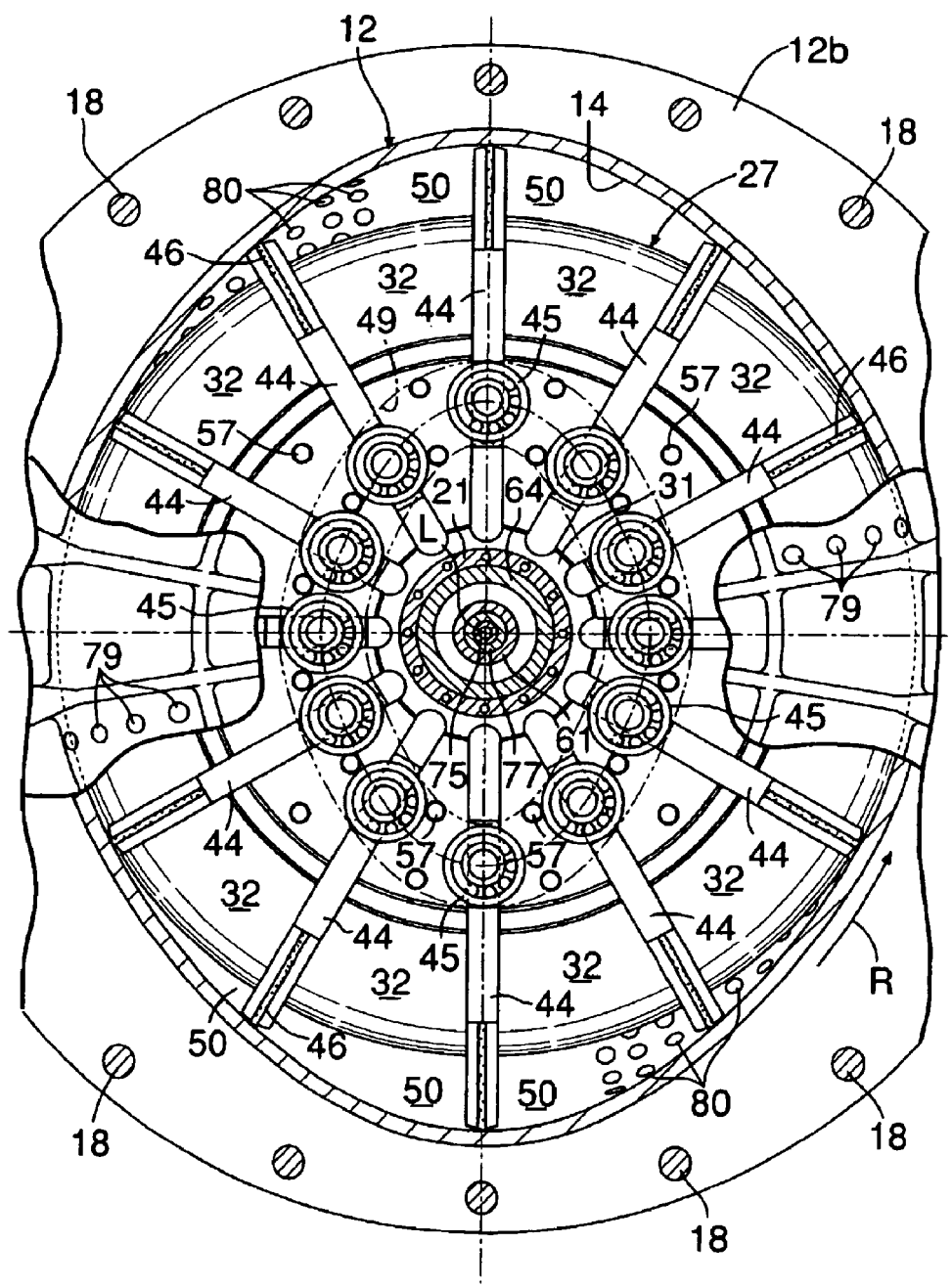

As shown in FIG. 5, a plurality of intake ports 79 are defined in a radial arrangement in the first casing half 12 at locations advanced at an angle of 15° in a direction of rotation of the rotor 27, based on a direction of the shorter-diameter of the rotor chamber 14. The internal space in the rotor chamber 14 communicates with the relay chamber 19 by virtue of the intake ports 79. A large number of exhaust ports 80 are provided and arranged in a plurality of radial arrays in the second casing half 13 at locations delayed at an angle of 15° to 75° in the direction of rotation of the rotor 27, based on the direction of the shorter-diameter of the rotor chamber 14. The internal space in the rotor chamber 14 communicates with the exhaust chamber 20 by virtue of the exhaust ports 80.

A rotary valve V is formed to permit the periodical communication of the second vapor passages S2, S2 and the third vapor passages S3 with each other as well as the periodical communication of the notches 64*b*, 64*b* in the first fixing shaft 64 and the third vapor passages S3 with each other by relative rotation of the first fixing shaft 64 and the rotary shaft 21.

Figure 2:
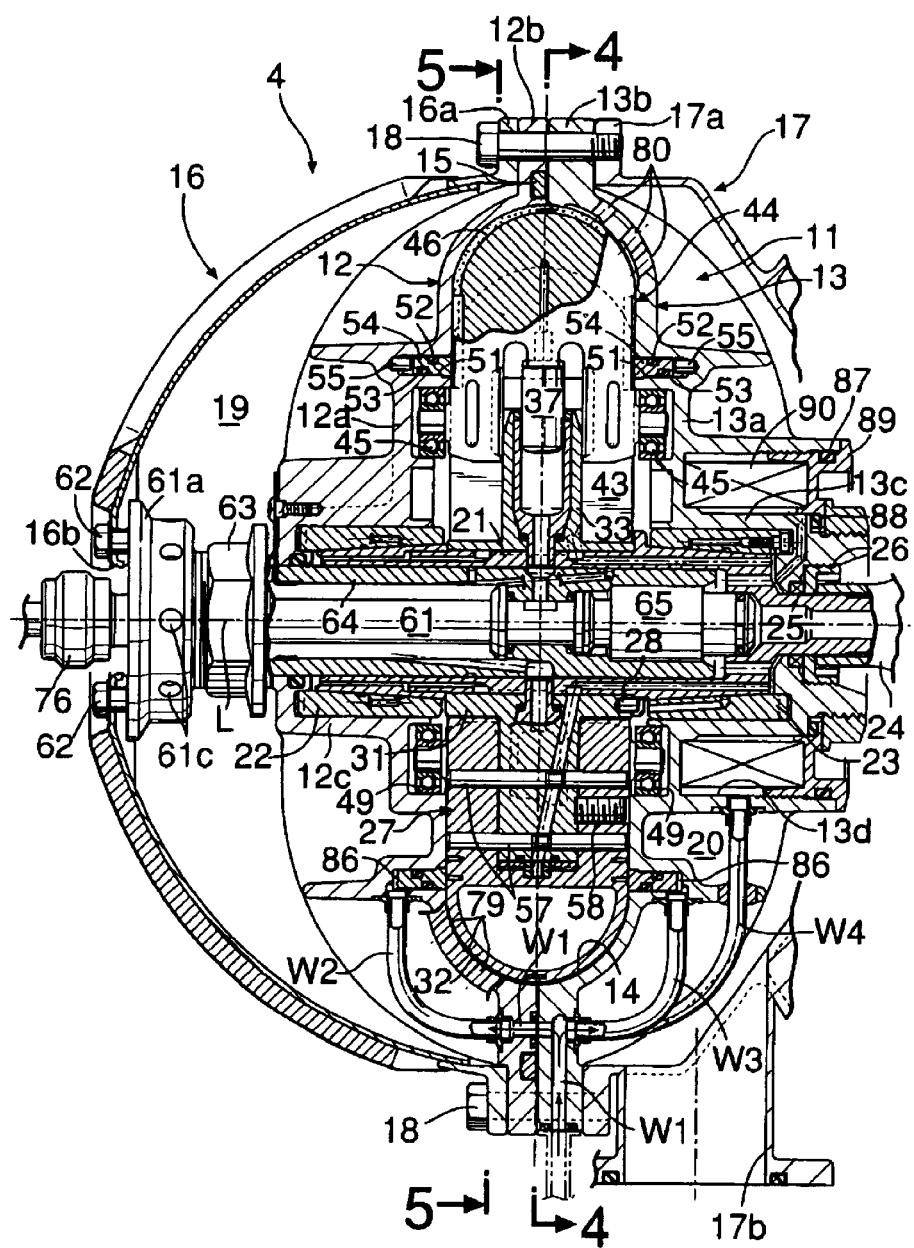

As can be seen from FIGS. 2 and 3, pressure chambers 86, 86 are defined in backs of the ring seals 54, 54 fitted in the circular seal grooves 51, 51 in the first and second casing halves 12 and 13, and a first water passage W1 defined in the first and second casing halves 12 and 13 communicates with both of the pressure chambers 86, 86 through a second water passage W2 and a third water passage W each including a pipe. A filter chamber 13*d* capable of being opened and closed by a cover 89 provided with two O-rings 87 and 88 is defined radially outside the hollow bearing tube 13*c* of the second casing half 13, and an annular filter 90 is accommodated in the filter chamber 13*d*. The first water passage W1 in the second casing half 13 communicates with an outer peripheral surface of the filter 90 through a fourth water passage W4 including a pipe, and an inner peripheral surface of the filter 90 communicates with a sixth annular water passage W6 defined between the second casing half 13 and the rotary shaft 21 through a fifth water passage W5 defined in the second casing half 13. The sixth water passage W6 communicates with the twelve orifice-defined members 41 through twelve seventh water passages W7 extending axially within the rotary shaft 21, an annular groove 21*d* defined in the outer periphery of the rotary shaft 21 and twelve eighth water passages W8 extending radially within the rotor core 31, respectively.

The annular groove 21*d* defined in the outer periphery of the rotary shaft 21 communicates with an annular groove 21*e* defined in outer periphery of the rotary shaft 21 through twelve ninth water passages W9 (see FIG. 7) extending axially, and the annular groove 21*e* communicates with an eleventh annular water passage W11 defined between the left end of the rotary shaft 21*e* and the first housing half 12 through twelve tenth water passages W10 extending axially within the rotary shaft 21. The sixth annular water passage W6 and the eleventh annular water passage W11 communicate with sliding surfaces between the inner peripheries of the bearing members 22 and 23 and the outer periphery of the rotary shaft 21 through orifices around outer peripheries of orifice-defining bolts 91 threadedly fitted in the bearing members 22 and 23 and further via twelfth water passages W12 defined in the bearing members 22 and 23. The sliding surfaces between the inner peripheries of the bearing members 22 and 23 and the outer periphery of the rotary shaft 21 communicate with the vane grooves 43 via thirteenth draining water passages W13.

The sixth annular water passage W6 communicates with sliding portions between the inner peripheral surface of the hollow 21*a* in the rotary shaft 21 and the outer peripheral surface of the right end of the first fixing shaft 64 via two thirtieth water passages W30, W30 provided axially in the rotary shaft 21. A seal groove 64*c* defined at the right of the thickened portion 64*a* of the first fixing shaft 64 communicates with the fifth vapor passage S5 through thirty-first water passages W31, W31 provided obliquely in the first fixing shaft 64. The eleventh annular water passage W11 communicates with sliding portions between the inner peripheral surface of the hollow 21*a* in the rotary shaft 21 and the outer peripheral surface of the left end of the first fixing shaft 64, and a seal groove 64*d* defined at the left of the thickened portion 64*a* of the first fixing shaft 64 communicates with the fifth vapor passage S5 through thirty-second water passages W32, W32 extending radially through the first fixing shaft 64 and the thirty-first water passages W31, W31.

Next, the operation of the present embodiment having the above-described arrangement will be described below.

Figure 6:
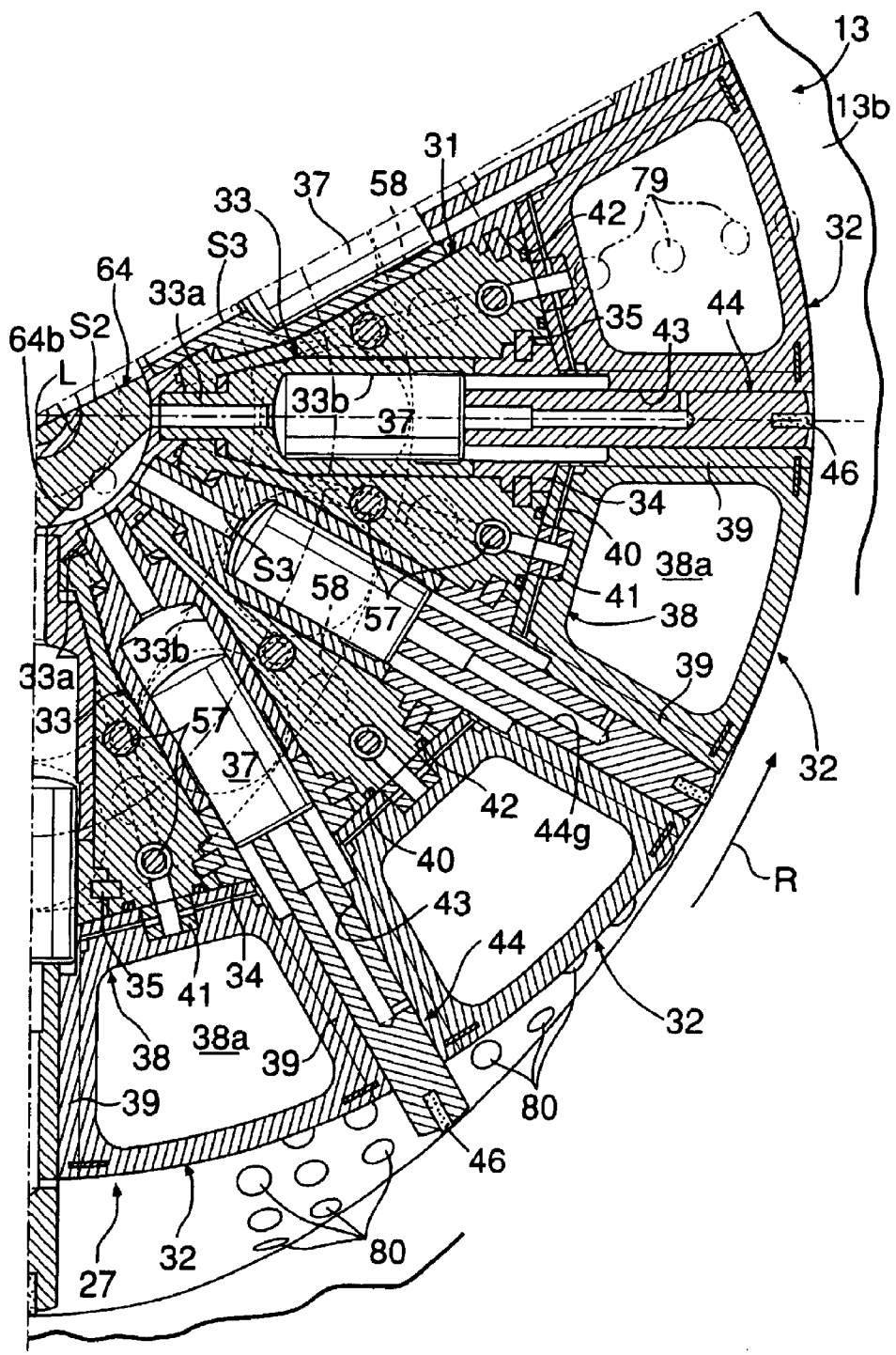

First, the operation of the expander 4 will be described. Referring to FIG. 3, the high-temperature and high-pressure vapor from the evaporator 3 is supplied to the vapor supply pipe 75, the first vapor passage S1 defined axially in the nozzle member 77 and the pair of second vapor passages S2, S2 extending radially through the nozzle member 77, the joint members 78, 78 and the thickened portion 64*a* of the first fixing shaft 64. Referring to FIGS. 6 and 7, when the rotary shaft 21 rotated in unison with the rotor 27 reaches a predetermined phase, the pair of third vapor passages S3, S3 existing at the locations advanced in the direction of rotation of the rotor 27 shown by an arrow R from a shorter diameter position of the rotor chamber 14 are put into communication with the pair of second vapor passages S2, S2, whereby the high-temperature and high-pressure vapor in the second vapor passages S2, S2 is supplied into the pair of cylinders 33, 33 via the third vapor passages S3, S3 to push the pistons 37, 37 radially outwards. When the vanes 44, 44 pushed by the pistons 37, 37 are moved radially outwards, the advancing movements of the pistons 37, 37 are converted into the rotational movement of the rotor 27 by the engagement of the pair of rollers 45, 45 mounted on the vanes 44, 44 and the annular grooves 49, 49 with each other.

Even after the communication between the second vapor passages S2, S2 and the third vapor passages S3, S3 is blocked with the rotation of the rotor 27 in the direction indicated by the arrow R, the pistons 37, 37 are advanced by the further continuation of the expansion of the high-temperature and high-pressure vapor within the cylinders 33, 33, whereby the rotation of the rotor 27 is continued.

When the vanes 44, 44 reaches a longer-diameter position of the rotor chamber 14, the third vapor passages S3, S3 leading to the corresponding cylinders 33, 33 are put into communication with the notches 64b, 64b of the first fixing shaft 64, and the pistons 37, 37 pushed by the vanes 44, 44 with the rollers 45, 45 guided in the annular grooves 49, 49 are moved radially inwards, whereby the vapor in the cylinders 33, 33 is supplied as a first dropped-temperature and dropper-pressure vapor into the relay chamber 19 through the third vapor passages S3, S3, the notches 64b, 64b, the fourth vapor passages S4, S4, the fifth vapor passage S5, the sixth vapor passage S6 and the through-bores 61c. The first dropped-temperature and dropper-pressure vapor is a vapor resulting from the high-temperature and high-pressure vapor supplied from the vapor supply pipe 75, which has finished its work for driving the pistons 37, 37 to have a dropped temperature and a dropped pressure. The heat energy and the pressure energy possessed by the first dropped-temperature and dropper-pressure vapor are lower than those of the high-temperature and high-pressure vapor, but are still at levels sufficient to drive the vanes 44.

The first dropped-temperature and dropped pressure vapor within the relay chamber 19 is supplied from the intake ports 79 in the first casing half 12 into the vane chamber 50 in the rotor chamber 14, namely, into the space defined by the rotor chamber 14, the rotor 27 and the pair of adjacent vanes 44, 44, where the vapor is further expanded to rotate the rotor 27. The second dropped-temperature and dropped pressure vapor resulting from the first dropped-temperature and dropped pressure vapor finishing its work to have the dropped temperature and pressure is discharged from the exhaust ports 80 in the second casing half 13 into the exhaust chamber 20 and supplied therefrom via the discharge port 17b into the condenser 5.

In this manner, the twelve pistons 37 are operated sequentially by the expansion of the high-temperature and high-pressure vapor to rotate the rotor 27 through the rollers 45, 45 and the annular grooves 49, 49, and an output is produced from the rotary shaft 21 by rotating the rotor 27 through the vanes 44 by the expansion of the first dropped-temperature and dropped-pressure vapor resulting from the dropping of the temperature and pressure of the high-temperature and high-pressure vapor.

The lubrication of various sliding portions of the expansion 4 by the water will be described below.

The supplying of the lubricating water is carried out utilizing the supply pump 6 (see FIG. 1) for supplying the water under a pressure from the condenser 5 to the evaporator 3, and a portion of the water discharged by the supply pump 6 is supplied as a lubricating water to the first water passage W1 in the casing 11. By utilizing the supply pump 6 to supply the water to static pressure bearings at various portions of the expander 4, a special pump is not required, leading to a reduction in number of parts.

The water supplied to the first water passage W1 is supplied via the second water passage W2 and the third water passage W3 each including the pipe into the pressure chambers 86, 86 in the bottoms of the circular seal grooves 51, 51 in the first casing half 12 and the second casing half 13 to bias the ring seals 54, 54 toward the side of the rotor 27. The water supplied from the first water passage W1 to the fourth water passage W4 including the pipe, after being filtered by the filter 90 to remove a foreign matter, is supplied to the fifth water passage W5 defined in the second casing half 13, the sixth water passage W6 defined between the second casing half 13 and the rotary shaft 21, the seventh water passages W7 defined within the rotary shaft 21, the annular grieve 21d in the rotary shaft 21 and the eighth water passages W8 defined in the rotor core 31, where the water is further pressurized by the centrifugal force produced with the rotation of the rotor 27 and then supplied to the orifice-defined members 41 of the rotor segments 32.

In each of the rotor segments 32, the water flowing through the orifice-defined member 41 into the fourteenth water passage W14 in the bottom plate 40 is passed through the twenty-second water passage W22 in the side plate 39 and ejected from the lubricating water ejection bores 39a, and the water flowing through the orifice-defined member 41 into the seventeenth water passage W17 in the bottom plate 40 is passed through the twenty-first water passage W21 in the block member 38 and the twenty-fifth water passage W25 in the side plate 39 and ejected from the lubricating water ejection bores 39a. The water flowing through the orifice-defined member 41 into the eighteenth water passage W18 in the bottom plate 40 is passed through the twenty-sixth water passage W26 in the side plate 39 and ejected from the lubricating water ejection bores 39a, and the water flowing through the orifice-defined member 41 into the nineteenth water passage W19 in the bottom plate 40 is passed through the twenty-seventh water passage W27 in the side plate 39 and ejected from the lubricating water ejection bores 39a. Lower two of the four lubricating water ejection bores 39a opening into the surface of the side plate 39 communicate with the insides of the recesses 44e, 44e in the two vanes 44.

The water flowing through the orifice-defined member 41 into the fifteenth water passage W15 in the bottom plate 40 is passed through the twenty-third water passage W23 in the side plate 39 and the twenty-ninth water passage W29 in the block member 38 and ejected from the lubricating water ejection bore 38e within the recess 38c, and the water flowing through the orifice-defined member 41 into the sixteenth water passage W16 in the bottom plate 40 is passed through the twentieth water passage W20 in the block member 38, the twenty-fourth water passage W24 in the side plate 39 and the twenty-eighth water passage W28 in the block member 38 and ejected from the lubricating water ejection bore 38d within the recess 38b.

The water ejected from the lubricating water ejection bores 39a in the side plate 39 of each of the rotor segments 32 into the vane groove 43 forms a static pressure bearing between the vane groove 43 and the vane 44 slidably fitted in the vane groove 43 to support the vane 44 in a floated state, thereby preventing the solid contact of the side plate 39 of the rotor segment 32 and the vane 44 with each other to prevent the occurrences of the seizure and the wearing. By supplying the water for lubricating the sliding surface of the vane 44 through the eighth water passage W8 provided radially in the rotor 27 in the above manner, the water can be pressurized by the centrifugal force, and moreover, the temperature around the rotor 27 can be stabilized to reduce the influence due to the thermal expansion, and the set clearance can be maintained to minimize the leakage of the vapor.

A circumferential load applied to each of the vanes 44 (a load in a direction perpendicular to the plate-shaped vane 44) is a resultant force derived from a load due to a difference between vapor pressures applied to the front and rear surfaces of the vane 44 within the rotor chamber 14 and the circumferential components of reaction forces received from the annular grooves 49, 49 by the rollers 45, 45 mounted on the vane 44, but these loads are varied periodically depending on the phase of the rotor 27. Therefore, the vane 44 receiving such unbalanced load periodically shows such a behavior that it is inclined within the vane groove 43.

If the vane 44 is inclined by the unbalanced load in this manner, the clearance between the vane 44 and the four lubricating water discharge bores 39a opening into the side plates 39, 39 of the rotor segments 32 on opposite sides of the vane 44 is varied and hence, the water film in the widened portion of the clearance is carried away, and it is difficult for the water to be supplied into the narrowed portion of the clearance. For this reason, there is a possibility that the pressure may not be built up at the sliding portions, whereby the vane 44 may be brought into direct contact with the sliding surfaces of the side plates 39, 39 to become worn. According to the present embodiment, however, the water is supplied through the orifices into the lubricating water discharge bores 39a by the orifice-defined member 41 mounted on the rotor segment 32 and hence, the above-described disadvantage is overcome.

More specifically, when the clearance between the lubricating water discharge bores 39a and the vane 44 is widened, the pressure of water supplied is constant and hence, the flow rate of the water is increased by an increase in amount of water flowing out of the clearance relative to a constant pressure difference produced across the orifice in a steady state, whereby the pressure difference across the orifice is increased by virtue of an orifice effect, leading to a reduction in the pressure in the clearance. As a result, a force for narrowing the clearance back to the original width is generated. Further, when the clearance between the lubricating water discharge bores 39a and the vane 44 is narrowed, the amount of water flowing out of the clearance is decreased, whereby the pressure difference across the orifice is decreased. As a result, the pressure in the clearance is increased and a force for widening the clearance back to the original width is generated.

Even if the clearance between the lubricating water discharge bores 39a and the vane 44 is varied by the load applied to the vane 44, as described above, the orifices automatically regulate the pressure of the water supplied to the clearance depending on the variation in size of the clearance and hence, the clearance between the vane 44 and each of the side plates 39, 39 of the rotor segments 32 on the opposite sides of the vane 44 can be maintained stably at a desired size. Thus, the water film can be always retained between the vane 44 and each of the side plates 39, 39 to support the vane 44 in the floated state, thereby reliably avoiding that the vane 44 is brought into solid contact with the sliding surface of each of the side plates 39, 39 to become worn.

In addition, the water is retained in each of the two recesses 44e, 44e defined in each of the opposite surfaces of the vane 44 and hence, each of the recesses 44e, 44e serves as a pressure dam to suppress a drop in pressure due to the leakage of the water. As a result, the vane 44 clamped between the sliding surfaces of the pair of side plates 39, 39 is retained in the floated state by means of the water, whereby the sliding resistance can be decreased to near zero. When the vane 44 is moved reciprocally, the radial position of the vane 44 relative to the rotor 27 is changed, but the vane 44 moved reciprocally can be always retained in the floated state to effectively reduce the sliding resistance, because the recesses 44e, 44e are provided in the vane 44 rather than in the side plates 39, 39 and provided in the vicinity of the rollers 45, 45 with the load applied most largely to the vane 44.

The water which has lubricated the sliding surfaces of the vane 44 on the side plates 39, 39 is moved radially outwards by the centrifugal force to lubricate the sliding portions of the seal member 46 mounted on the arcuate face 44b of the vane 44 and the arcuate face 14b of the rotor chamber 14. The water which has finished the lubrication is discharged from the rotor chamber 14 through the exhaust ports 80.

As described above, the water is supplied to the pressure chambers 86, 86 in the bottoms of the circular seal grooves 51, 51 in the first casing half 12 and the second casing half 13 to bias the ring seals 54, 54 toward the side of the rotor 27, and the water is ejected from the lubricating water ejection bores 38d and 38e defined within the recesses 38b and 38c in each of the rotor segments 32 to form the static pressure bearing on the sliding surface on the flat faces 14a, 14a of the rotor chamber 14, whereby the flat faces 27a, 27a of the rotor 27 can be sealed by the ring seals 54, 54 which are in the floated state within the circular seal grooves 51, 51. As a result, the vapor in the rotor chamber 14 can be prevented from being leaked through the clearance between the rotor chamber 14 and the rotor 27. At this time, the ring seals 54, 54 and the rotor 27 are isolated from each other by the water films supplied from the lubricating water ejection bores 38d and 38e, so that they cannot be brought into solid contact with each other. In addition, even if the rotor 27 is inclined, the ring seals 54, 54 within the circular seal grooves 51, 51 are inclined, following the inclination of the rotor 27, whereby the stable sealing performance can be ensured, while minimizing the frictional force.

The water which has lubricated the sliding portions of the ring seals 54, 54 and the rotor 27 is supplied to the rotor chamber 14 by the centrifugal force and discharged therefrom via the exhaust ports 80 to the outside of the casing 11.

On the other hand, the water supplied from the sixth water passage W6 flows via the orifices defined around the outer peripheries of the orifice-defining bolts 91 of the bearing member 23 and the twelfth water passages W12 to form the water film on sliding surfaces of the inner periphery of the bearing member 23 and the outer periphery of the rotary shaft 21 to support the outer periphery of a right half of the rotary shaft 21 in the floated state by the water film, thereby lubricating the sliding surfaces in such a manner that the solid contact of the rotary shaft 21 and the bearing member 23 with each other is prevented to prevent the occurrences of the seizure and the wearing. The water supplied from the sixth water passage W6 to the seventh water passages W7, the ninth water passages W9, the tenth water passages W10 and the eleventh water passage W11 defined in the rotary shaft 21 flows via the orifices defined around the outer peripheries of the orifice-defining bolts 91 in the bearing member 22 and the twelfth water passages W12 to form the water film on sliding surfaces of the inner periphery of the bearing member 22 and the outer periphery of the rotary shaft 21 to support the outer periphery of a left half of the rotary shaft 21 in the floated state by the water film, thereby lubricating the sliding surfaces in such a manner that the solid contact of the rotary shaft 21 and the bearing member 22 with each other is prevented to prevent the occurrences of the seizure and the wearing. The water which has lubricated the sliding surfaces of the bearing members 22 and 23 is discharged via the thirteenth water passages W13 defined within the bearing members 22 and 23 into the vane grooves 43.

The water accumulated in the vane grooves 43 flows into the water discharge passages 44g connecting the bottoms of the vanes 44 with one-sides of the vanes 44, but because the water discharge passages 44g open into the rotor chamber 14 in a predetermined angle range where the vanes 44 protrude most largely from the rotor 27, the water in the vane grooves 43 is discharged via the water discharge passages 44g into the rotor chamber 14 under the action of a difference in pressure between the vane grooves 43 and the rotor chamber 14.

The water supplied from the sixth water passage W6 via the thirtieth water passage W30 defined in the rotary shaft 21 lubricates the outer periphery of the first fixing shaft 64 and the right half of the sliding surface on the inner periphery of rotary shaft 21, and is then discharged from the seal groove 64c in the first fixing shaft 64 via the thirty-first water passages W31, W31 to the fifth vapor passage S5. Further, the water from the eleventh water passage W11 lubricates the outer periphery of the first fixing shaft 64 and the left half of the sliding surface on the inner periphery of the rotary shaft 21, and is then discharged from the seal groove 64d in the first fixing shaft 64 via the thirty-first water passage W31 to the fifth vapor passage S5.

As described above, the rotor 27 of the expander 4 is formed in a divided manner by the rotor core 31 and the plurality of rotor segments 32 and hence, the dimensional accuracy of the vane grooves 43 in the rotor 27 can be enhanced easily. In the simple rotor 27, it is extremely difficult to make the vane grooves 43 with a groove width having a good accuracy to enhance the surface roughness of the sliding surface, but such problem can be solved by assembling the plurality of previously fabricated rotor segments 32 to the rotor core 31. Moreover, even if an error is accumulated due to the assembling of the plurality of rotor segments 32, the accumulation of error can be absorbed by regulating the size of the last one of the rotor segments 32, thereby fabricating the rotor 27 having a high accuracy as a whole.

The inner rotor core 31 to which the high-temperature and high-pressure vapor is supplied and each of the outer rotor segments 32 relatively low in temperature are formed by the different members. Therefore, the transmission of heat from the rotor core 31 having the high temperature to the rotor segments 32 can be suppressed, whereby the dissipation of heat to the outside of the rotor 27 can be prevented to enhance the thermal efficiency, and moreover, the thermal deformation of the rotor 27 can be moderated to enhance the accuracy. Further, a material and a processing method suitable for each of the functions of the rotor core 31 and the rotor segments 32 can be selected and hence, the degree of freedom of the design and the degree of freedom of the processing method are increased, and the alleviation of the wearing of the sliding surfaces of the rotor segments 32 and the vanes 44, an enhancement in durability and an enhancement in sealability can be achieved. Further, even when a disadvantage occurs in a portion of the rotor 27, the rotor 27 can be repaired only by replacing such portion by a new portion. This can contribute to a reduction in cost, as compared with a case where the entire rotor 27 is replaced by a new rotor, or is discarded.

In addition to the above-described embodiment, in an arrangement ensuring the conversion of the advancing movements of the pistons 37 into the rotational movement of the rotor 27, the advancing movements of the pistons 37 can be received directly by the rollers 45 without through the vanes 44 and converted into the rotational movement of the rotor 27 by the engagement of the rollers in the annular grooves 49, 49. In addition, the vanes 44 may be always spaced at a substantially constant distance apart from the inner peripheral surface of the rotor chamber 14 as described above by cooperation of the rollers 45 and the annular grooves 49, 49 with each other. Alternatively, the pistons 37 and the rollers 45, as well as the vanes 44 and the rollers 45 may cooperate with annular grooves 49, 49 independently.

When the expander 4 is used as a compressor, the rotor 27 is rotated by the rotary shaft 21 in a direction opposite from the direction indicated by the arrow R in FIG. 4 to drawn the open air as a fluid into the rotor chamber 14 through the exhaust ports 80 by the vanes 44 to compress it. A low-compressed air produced in the above manner is drawn from the intake ports 79 via the relay chamber 19, the through-bores 61c, the sixth vapor passage S6, the fifth vapor passages S5, S5, the fourth vapor passages S4, S4, the notches 64b, 64b in the first fixing shaft 64 and the third vapor passages S3 into the cylinders 33, where it is compressed by the pistons 37 to provide a high-compressed air. The high-compressed air produced in the above manner is discharged from the cylinders 33 via the third vapor passages S3, the second vapor passages S2, S2, the first vapor passage S1 and the vapor supply pipe 75. When the expander 4 is used as the compressor, the vapor passages S1 to S5 and the vapor supply pipe 75 are read as air passages S1 to S5 and an air supply pipe 75, respectively.

In the above-described expander 4, a first energy-converting means including the cylinders 33 and the pistons 37 and a second energy-converting means including the vanes 44 are provided in the common rotor 27, so that an energy of the high-temperature and high-pressure vapor is taken out as a mechanical energy into the rotary shaft 21 by cooperation of the first and second energy-converting means connected in line with each other. Therefore, the mechanical energy output by the first energy-converting means and the mechanical energy output by the second energy-converting means can be automatically unified through the rotor 27 and thus, a special energy-unifying means having a power-transmitting means such as a gear is not required.

Since the first energy-converting means includes the combination of the cylinders 33 and the pistons 37, in which it is easy to seal the working fluid, thereby ensuring that the leakage of the fluid is hard to occur, it is possible to enhance the sealability for the high-temperature and high-pressure vapor to minimize a reduction in efficiency due to the leakage. On the other hand, since the second energy-converting means includes the vanes 44 radially movably supported in the rotor 27, the vapor pressure applied to the vanes 44 is converted directly into the rotational movement of the rotor 27 and thus, a special converting mechanism for converting the reciprocal movement into the rotational movement is not required, leading to a simplified structure. Moreover, the second energy-converting manes capable of effectively converting the vapor having a low pressure and a large flow rate into the mechanical energy is disposed to surround the outer periphery of the first energy-converting means and hence, it is possible to reduce the size of the entire expander 4 for the compactness of the latter.

The first energy-converting means including the cylinders 33 and the pistons 37 has a characteristic that a high efficiency of conversion between the pressure energy and the mechanical energy is shown when the high-temperature and high-pressure vapor is used as a working fluid, and the second energy-converting means including the vanes 44 has a characteristic that a high efficiency of conversion between the pressure energy and the mechanical energy is shown even when a relatively low-temperature and relatively low-pressure vapor is used as a working fluid. Therefore, the energy included in the original high-temperature and high-pressure can be converted exhaustively and effectively into the mechanical energy by connecting the first and second energy-converting means in line to each other, and by passing the high-temperature and high-pressure vapor through the first energy-converting means to convert its energy into the mechanical energy and then passing the first dropped-temperature and dropped-pressure vapor having a resulting dropped pressure through the second energy-converting means to covert its energy again into the mechanical energy.

Even when the expander 4 in the present embodiment is used as the compressor, a mechanical energy can be efficiently converted into a pressure energy (a heat energy) of a compressed air by compressing air drawn into the rotor chamber 14 by rotating the rotor 27 by a mechanical energy input from the outside to raise its temperature by the second energy-converting means operated effectively even by a working fluid having a relatively low temperature and relatively low pressure, and further compressing the compressed and raised-temperature air to raise its temperature by the first energy-converting means operated effectively by a working fluid having a relatively high temperature and relatively high pressure. Thus, by combining the first energy-converting means including the cylinders 33 and the pistons 37 and the second energy-converting means including the vanes 44, a high-performance rotary fluid machine having characters of both of the converting means can be provided.

In addition, when the rotational axis L of the rotor 27 (namely, the rotational axis L of the rotary shaft 21) is matched with the center of the rotor chamber 14, and the rotor 27 is divided vertically and laterally at 90° into four components in FIGS. 4 and 5, the conversion of the pressure energy into the mechanism energy is carried out by a right and upper quarter and a left and lower quarter point-symmetric each other with respect to the rotational axis L. Therefore, it is possible to prevent an unbalanced load from being applied to the rotor 27 to suppress the generation of a vibration. In other words, the portions for converting the pressure energy of the working fluid into the mechanical energy and the portion for converting the mechanical energy into the pressure energy of the working fluid are disposed at two points displaced through 180° about the axis L of the rotor 27. Therefore, a load applied to the rotor 27 is a force couple to enable the smooth rotation and moreover, an intake timing and an exhaust timing can be made efficiently.

In the present embodiment, in a Ranking cycle including the evaporator 3 for generating a high-temperature and high-pressure vapor by heating water by a heat energy of an exhaust gas from the internal combustion engine 1, the expander 4 for converting the high-temperature and high-pressure vapor supplied from the evaporator 3 into a shaft output having a constant torque, the condenser 5 for liquefying a dropped-temperature and dropped-pressure vapor discharged from the expander 4, and the supply pump 6 for supplying the water liquefied in the condenser 5 to the evaporator 3, a volume-type expander is employed as the expander 4. This volume-type expander 4 is capable of conducting the energy recovery at a high efficiency in a wide rotational speed region from a low speed to a high speed, as compared with a non-volume type expander such as a turbine, and moreover, is excellent in followability and responsiveness to a variation in heat energy of an exhaust gas (a variation in temperature and a variation in flow rate of the exhaust gas) attendant on an increase and decrease in rotational speed of the internal combustion engine 1. Moreover, the expander 4 is constructed as a double-expansion type in which the first energy-converting means including the cylinders 33 and the pistons 37 and the second energy-converting means including the vanes 44 are connected in line to each other and disposed at radially inner and outer locations. Therefore, the efficiency of the recovery of the heat energy by the Rankine cycle can be further enhanced, while reducing the size of the expander 4 to provide an enhancement in space efficiency.

Although the embodiment of the present invention has been described in detail, it will be understood that the present invention is not limited to the above-described embodiment, and various modifications in design may be made without departing from the spirit and scope of the invention defined in claim.

For example, in the expander 4 in the embodiment, the high-temperature and high-pressure vapor is first supplied to the cylinders 33 and the pistons 37 forming the first energy-converting means, and the first dropped-temperature and dropped-pressure vapor resulting from the dropping of the temperature and pressure of the high-temperature and high-pressure vapor is then supplied to the vanes 44 forming the second energy-converting means. However, vapors having different temperatures and different pressures may be supplied individually to the first and second energy-converting means, for example, by ensuring that the sixth vapor passage S6 for discharging the first dropped-temperature and dropped-pressure vapor from the first energy-converting means shown in FIG. 3 and the relay chamber 19 are disposed in communication or non-communication with each other and further, constructing a means in the relay chamber 19 for enabling the vapor to be supplied independently to the second energy-converting means through the relay chamber outer-wall 16. Further, vapors having different temperatures and different pressures may be supplied individually to the first and second energy-converting means, respectively, and the vapor passed through the first energy-converting means and having a dropped-temperature and dropped pressure may be supplied to the second energy-converting means.

INDUSTRIAL APPLICABILITY

The rotary fluid machine according to the present invention is suitable for use as an expander for a Rankine cycle system, but is capable of being used as an expander for any other application or a compressor for any other application.

What is claimed is:

1. A rotary fluid machine comprising:

at least a first energy-converting portion and a second energy-converting portion, said rotary fluid machine being capable of functioning as an expander for unifying and outputting mechanical energies generated respectively by the first and second energy-converting portions by inputting a working fluid having a pressure energy into the first and second energy-converting portions to convert said pressure energy into a mechanical energy, said rotary fluid machine being capable of functioning as a compressor for unifying and outputting pressure energies of the working fluid generated respectively by the first and second energy-converting portions by inputting a mechanical energy into the first and second energy-converting portions to convert said mechanical energy into the pressure energy, said first energy-converting portions including cylinders supported radially in a rotor rotatably accommodated in a rotor chamber, and pistons slidably supported in said cylinders, and said second energy-converting portions including vane grooves defined radially in the rotor, and vanes slidably supported in said vane grooves with outer peripheral surfaces thereof being in sliding contact with an inner peripheral surface of the rotor chamber, wherein said rotor includes a rotor core which is supported on a rotary shaft and in which said cylinders are accommodated, and rotor segments separated in a circumferential direction from and formed separately from said rotor core and fixed to surround an outer periphery of said rotor core, each of said vane grooves for slidably supporting the vanes therein being defined between adjacent ones of the rotor segments.

2. The rotary fluid machine according to claim 1, wherein said first energy-converting portion is operated by an operating fluid of a relatively high temperature and said second energy-converting portion is operated by an operating fluid of a relatively low temperature.

3. The rotary fluid machine according to claim 1, wherein said rotor chamber is formed in an approximately elliptical shape and houses said rotor therein, said rotor having a circular shape with respect to a rotating axis of said rotor.

4. The rotary fluid machine according to claim 1, said rotor core further including a disk-shaped main body and gear-shaped boss portions protruding in axially opposite directions from a central portion of said main body.

5. The rotary fluid machine according to claim 1, wherein each rotor segment of said rotor segments includes a pair of block members having hollow portions therein, a pair of side plates formed of a U-shaped plate material, and a bottom plate formed in a rectangular shape.

6. The rotary fluid machine according to claim 5, wherein said pair of block members, said pair of side plates and said bottom plate are integrally connected together by brazing.

7. The rotary fluid machine according to claim 5, further comprising a pair of recesses formed in an outer peripheral surface of each of said block members.

8. The rotary fluid machine according to claim 5, further comprising an arcuate ring having a plurality of orifices formed therein, said arcuate ring being provided in a central portion of said bottom plate.

9. The rotary fluid machine according to claim 4, wherein each rotor segment of said rotor segments includes a pair of block members having hollow portions therein, a pair of side plates formed of a U-shaped plate material, and a bottom plate formed in a rectangular shape.

10. The rotary fluid machine according to claim 9, wherein said pair of block members, said pair of side plates and said bottom plate are integrally connected together by brazing.

11. The rotary fluid machine according to claim 10, further comprising a pair of recesses formed in an outer peripheral surface of each of said block members.

12. The rotary fluid machine according to claim 11, further comprising an arcuate ring having a plurality of orifices formed therein, said arcuate ring being provided in a central portion of said bottom plate.

* * * * *